United States Patent
Sethi et al.

(10) Patent No.: US 9,699,011 B1
(45) Date of Patent: Jul. 4, 2017

(54) CONTINUOUS PHASE MODULATION SIGNALING

(71) Applicant: Marvell International Ltd., Hamilton (BM)

(72) Inventors: Ankit Sethi, Maharashtra (IN); Swaroop Venkatesh, San Ramon, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/097,026

(22) Filed: Apr. 12, 2016

Related U.S. Application Data

(60) Provisional application No. 62/288,274, filed on Jan. 28, 2016.

(51) Int. Cl.
| | | |
|---|---|---|
| *H04B 1/707* | (2011.01) | |
| *H04L 27/20* | (2006.01) | |
| *H04L 27/36* | (2006.01) | |
| *H04W 4/00* | (2009.01) | |

(52) U.S. Cl.
CPC ...... *H04L 27/2017* (2013.01); *H04L 27/2082* (2013.01); *H04L 27/36* (2013.01); *H04W 4/008* (2013.01)

(58) Field of Classification Search
CPC . H04L 27/2017; H04L 27/2082; H04L 27/36; H04W 4/008
See application file for complete search history.

(56) References Cited

U.S. PATENT DOCUMENTS

| | | | | |
|---|---|---|---|---|
| 6,032,033 A | * | 2/2000 | Morris | H04B 7/0811 370/334 |
| 6,947,504 B1 | * | 9/2005 | Pettit | H04L 27/2273 375/326 |
| 2006/0215778 A1 | * | 9/2006 | Murthy | G06F 1/0353 375/260 |

* cited by examiner

*Primary Examiner* — Dac Ha

(57) ABSTRACT

A device includes a frequency offset (FO) estimation circuit and a frequency offset compensation circuit coupled with the frequency offset estimation circuit. The frequency offset compensation circuit is configured to (i) receive a continuous phase modulation (CPM) signal, (ii) receive, from the FO estimation circuit, an uncompensated frequency offset for a $w^{th}$ sampling window of the CPM signal, (iii) generate a frequency offset compensation value for a $w+1^{st}$ sampling window of the CPM signal based on the uncompensated frequency offset for the $w^{th}$ sampling window, (iv) adjust the CPM signal in the $w+1^{st}$ sampling window based on the frequency offset compensation value, and (v) provide the adjusted CPM signal to a filter.

29 Claims, 6 Drawing Sheets

CONTINUOUS PHASE MODULATION SIGNALING

CROSS REFERENCE TO RELATED APPLICATIONS

This application claims the benefit of priority under 35 U.S.C. §119(e) of U.S. Provisional Application No. 62/288,274, filed on Jan. 28, 2016, and entitled "METHOD AND APPARATUS FOR PROCESSING CPM SIGNALS," which is incorporated herein by reference in its entirety.

BACKGROUND

The following disclosure relates generally to systems and techniques for continuous phase modulation signaling.

Network devices can communicate with one another using continuous phase modulation (CPM) signaling, which is a modulation technique for communications signal transmission, in which the phase of the transmit carrier signal is modulated based on information symbols corresponding to the data to be transmitted. A receiver device decodes the information symbols by processing the phase of the received CPM signal.

SUMMARY

The present disclosure describes devices, systems and techniques to compensate for a frequency offset in a communications signal that is received at a communications receiver device, where the communications signal is modulated using continuous phase modulation (CPM). The receiver is configured to estimate the frequency offset in the communications signal, referred to henceforth as a CPM signal, and compensate the received CPM signal based on the estimated value. In some implementations, to perform frequency offset compensation, the receiver divides a received CPM baseband signal into non-overlapping windows, and obtains signal samples in each window. The receiver estimates an uncompensated frequency offset during a window w and uses this estimated value to generate a frequency offset compensation value for window w+1, which is used to compensate the signal samples present during the window w+1.

In some implementations, the receiver is also configured to estimate a modulation index of a received CPM signal. This can be useful, for example, when a transmitter transmits packets with modulation index values that vary from packet to packet, and these modulation index values are not known apriori by the receiver. In some implementations, the receiver also decodes information symbols encoded in the received CPM signal using a resource-efficient decoding algorithm.

In a general aspect, a device includes a frequency offset (FO) estimation circuit and a frequency offset (FO) compensation circuit coupled with the frequency offset estimation circuit. The frequency offset compensation circuit is configured to (i) receive a continuous phase modulation (CPM) signal, (ii) receive an uncompensated frequency offset for a $w^{th}$ sampling window of the CPM signal, (iii) generate a frequency offset compensation value for a $w+1^{st}$ sampling window of the CPM signal based on the uncompensated frequency offset for the $w^{th}$ sampling window, (iv) adjust the CPM signal in the $w+1^{st}$ sampling window based on the frequency offset compensation value, and (v) provide the adjusted CPM signal to a filter.

The frequency offset estimation circuit is configured to (i) receive first phase values of the adjusted CPM signal, (ii) receive second phase values of a compensating signal, (iii) generate the uncompensated frequency offset for the $w^{th}$ sampling window based on the first phase values of the adjusted CPM signal and the second phase values of the compensating signal, and (iv) provide the uncompensated frequency offset for the $w^{th}$ sampling window to the frequency offset compensation circuit.

Particular implementations may include one or more of the following features. The device may include a phase differentiator circuit coupled between the frequency offset estimation circuit and the frequency offset compensation circuit. The phase differentiator circuit may be configured to receive the adjusted CPM signal from the filter, determine the first phase values of the adjusted CPM signal, and provide the first phase values of the adjusted CPM signal to the frequency offset estimation circuit.

The filter may be configured to receive the adjusted CPM signal from the FO compensation circuit, forward the adjusted CPM signal to the phase differentiator circuit, and forward the adjusted CPM signal to a decoder.

The device may include a compensating signal generator, which may be configured to receive one or more information symbols at an input of the compensating signal generator, wherein the one or more information symbols are associated with the CPM signal. The compensating signal generator may generate the second phase values of the compensating signal based on the one or more information symbols, and may provide the second phase values of the compensating signal to FO estimation circuit.

The device may include a decoder. The decoder may be configured to receive the adjusted CPM signal from the filter, decode the adjusted CPM signal to obtain the one or more information symbols associated with the CPM signal, and provide the one or more information symbols to the compensating signal generator.

The FO estimation circuit may be configured to obtain information about a modulation index that is used for transmitting the CPM signal, and obtain information about the sampling window. The FO estimation circuit may generate the uncompensated frequency offset for the $w^{th}$ sampling window based on the modulation index and the information about the sampling window.

The CPM signal may include a Bluetooth signal. The CPM signal may be based on Gaussian Phase Shift Keying (GPSK) modulation.

The device may include a modulation index (MI) computation circuit, which may be configured to receive the first phase values of the adjusted CPM signal at a first input of the MI computation circuit, and receive the second phase values of the compensating signal at a second input of the MI computation circuit. The MI computation circuit may compute an estimated value of a modulation index that is used for transmitting the CPM signal based on the first phase values of the adjusted CPM signal and the second phase values of the compensating signal. The MI computation circuit may provide the estimated value of a modulation index to the FO estimation circuit.

The device may include a phase differentiator circuit, which may be configured to receive the adjusted CPM signal from the filter and obtain first phase values of the adjusted CPM signal. The phase differentiator circuit may provide the first phase values of the adjusted CPM signal to one or more of the MI computation circuit or the FO estimation circuit. The filter may be configured to receive the adjusted CPM signal from the FO compensation circuit, forward the adjusted CPM signal to the phase differentiator circuit, and forward the adjusted CPM signal to a decoder.

The device may include a compensating signal generator, which may be configured to receive one or more information symbols at an input of the compensating signal generator, wherein the one or more information symbols are associated with the CPM signal. The compensating signal generator may generate the second phase values of the compensating signal based on the one or more information symbols. The compensating signal generator may provide the second phase values of the compensating signal to one or more of the MI computation circuit or the FO estimation circuit. The device may include a decoder, which may be configured to receive the adjusted CPM signal from the filter, decode the adjusted CPM signal to obtain the one or more information symbols associated with the CPM signal, and provide the one or more information symbols to the compensating signal generator.

The FO estimation circuit may be configured to obtain the estimated value of the modulation index from the MI computation circuit, obtain information about the sampling window, and generate the uncompensated frequency offset for the $w^{th}$ sampling window based on the estimated value of the modulation index and the information about the sampling window.

Computing the estimated value of the modulation index based on the first phase values of the adjusted CPM signal and the second phase values of the compensating signal may include obtaining a product of the first phase values and the second phase values for each sample duration. The obtained products corresponding to the sampled durations for a preselected number of durations may be added to obtain a first summation. Quadratic values of the second phase values for each sample duration may be obtained. The quadratic values corresponding to the sampled durations for the preselected number of durations may be added to obtain a second summation. The first summation may be divided by the second summation to obtain the estimated value of the modulation index. The preselected number of durations may be programmable by a user.

Computing the estimated value of the modulation index based on the first phase values of the adjusted CPM signal and the second phase values of the compensating signal may include obtaining a first product of the first phase values and the second phase values for each sample duration. The first products corresponding to the sampled durations for a preselected number of durations may be added to obtain a first summation. A second product of the first summation and the preselected number of durations may be obtained. A third product of a summation of the first phase values for the preselected number of durations and a summation of the second phase values for the preselected number of durations may be obtained. Quadratic values of the second phase values for each sample duration may be obtained. The quadratic values corresponding to the sampled durations for the preselected number of durations may be added to obtain a second summation. A fourth product of the second summation and the preselected number of durations may be obtained. Quadratic values of the summation of the second phase values for the preselected number of durations may be obtained. A difference of the second product and the third product may be divided by a difference of the fourth product and the quadratic values of the summation of the second phase values to obtain the estimated value of the modulation index.

The MI computation circuit may be configured to compute a frequency offset of the received CPM signal based on the first phase values of the adjusted CPM signal and the second phase values of the compensating signal. Computing the frequency offset may include obtaining a fifth product of the quadratic values of the summation of the second phase values and the summation of the first phase values for the preselected number of durations. A sixth product of the first summation and the summation of the second phase values for the preselected number of durations may be obtained. A difference of the fifth product and the sixth product may be divided by a difference of the fourth product and the quadratic values of the summation of the second phase values to compute the frequency offset.

The device may include a decoder, which may be configured to receive the adjusted CPM signal from the filter. The decoder may obtain first signal samples of the adjusted CPM signal for a first period and generate a correlated signal array corresponding to consecutive information symbols. The decoder may obtain first values by correlating the first signal samples with the correlated signal array and populate a first cost matrix and a second cost matrix using the first values. Conditioned on determining that the first period is less than a total number of periods under consideration, the decoder may obtain second signal samples of the adjusted CPM signal for a second period succeeding the first period. The decoder may obtain second values by correlating the second signal samples with the correlated signal array. The decoder may regenerate the first cost matrix based on the second values and previously stored values of the second cost matrix, and regenerate the second cost matrix based on the first cost matrix. Conditioned on determining that the first period is not less than the total number of periods under consideration, the decoder may determine an element of the first cost matrix associated with a maximum magnitude of correlated values stored in the first cost matrix. The decoder may convert a decimal value of an index of the determined element to a binary string, and obtain information symbols of the adjusted CPM signal from the binary string.

The first period may correspond to a first symbol duration and the second period corresponds to a second symbol duration. A number of elements of the correlated signal array may be based on a number of signal samples in a symbol duration. Each index of elements of the first cost matrix and the second cost matrix may represent a state of the information symbols of the adjusted CPM signal.

Obtaining the first values may include populating a branch matrix using the first values. Populating the first cost matrix and the second cost matrix using the first values may include populating the first cost matrix and the second cost matrix using the branch matrix values. Obtaining the second values may include populating the branch matrix using the second values. Regenerating the first cost matrix may include regenerating the first cost matrix based on the second values stored in the branch matrix and the previously stored values of the second cost matrix. Regenerating the first cost matrix may include adding new elements to the first cost matrix corresponding to the second period.

In another general aspect, a continuous phase modulation (CPM) signal is received at a first input of a frequency offset (FO) compensation circuit. An uncompensated frequency offset for a $w^{th}$ sampling window of the CPM signal is received at a second input of the FO compensation circuit. A frequency offset compensation value for a $w+1^{st}$ sampling window of the CPM signal is generated based on the uncompensated frequency offset for the $w^{th}$ sampling window. The CPM signal in the $w+1^{st}$ sampling window is compensated using the frequency offset compensation value. The adjusted CPM signal is provided to a filter.

Particular implementations may include one or more of the following features. First phase values of the adjusted CPM signal may be received at a first input of an FO estimation circuit. Second phase values of a compensating signal may be received at a second input of the FO estimation circuit. The uncompensated frequency offset for the w$^{th}$ sampling window may be generated based on the first phase values of the adjusted CPM signal and the second phase values of the compensating signal. The uncompensated frequency offset for the w$^{th}$ sampling window may be provided to the FO compensation circuit.

The adjusted CPM signal from the filter may be received at a phase differentiator circuit. First phase values of the adjusted CPM signal may be obtained. The first phase values of the adjusted CPM signal may be provided to the FO estimation circuit.

One or more information symbols may be received at an input of a compensating signal generator. The one or more information symbols may be associated with the CPM signal. The second phase values of the compensating signal may be generated based on the one or more information symbols. The second phase values of the compensating signal may be provided to FO estimation circuit.

In another general aspect, a continuous phase modulation (CPM) signal is received. First signal samples of the CPM signal for a first period are obtained. A correlated signal array corresponding to consecutive information symbols is generated. First values are obtained by correlating the first signal samples with the correlated signal array. A first cost matrix and a second cost matrix are populated using the first values. Conditioned on determining that the first period is less than a total number of periods under consideration, second signal samples of the CPM signal are obtained for a second period succeeding the first period. Second values are obtained by correlating the second signal samples with the correlated signal array. The first cost matrix is regenerated based on the second values and previously stored values of the second cost matrix. The second cost matrix is regenerated based on the first cost matrix. Conditioned on determining that the first period is not less than the total number of periods under consideration, an element of the first cost matrix associated with a maximum magnitude of correlated values stored in the first cost matrix is determined. A decimal value of an index of the determined element is converted to a binary string. Information symbols of the CPM signal are obtained from the binary string.

Implementations of the above techniques include devices, systems, methods and computer program products. Such computer program products can be suitably embodied in a non-transitory machine-readable medium that stores instructions executable by one or more processors. The instructions are configured to cause the one or more processors to perform the above-described actions.

The systems and techniques disclosed in this application for compensating a received baseband signal using estimated frequency offset values can lead to significant improvement in the sensitivity or the decoding ability of the receiver, compared to receiver devices that do not implement such frequency offset estimation and compensation. The operations to estimate the modulation index of incoming packets can lead to improvements in the performance of the receiver to estimate the frequency offset of the received baseband signal. The performance improvements can be manifested in improvements in the signal-to-noise ratio (SNR) of the received signal, or in reduced error flooring in bit error rate (BER) or packet error rate (PER) of the received signal. Use of the decoding algorithm disclosed herein to decode information symbols encoded in the received CPM signal can lead to improved performance compared to other types of decoding schemes, e.g., maximum likelihood decoding schemes, but with less hardware complexity and cost. The decoding algorithm can help to improve the successful packet reception rate for incoming packets that use CPM signaling, and also improve the sensitivity and decoding frequency range of the receiver.

The details of one or more disclosed implementations are set forth in the accompanying drawings and the description below. Other features, aspects, and advantages will become apparent from the description, the drawings and the claims.

DETAILED DESCRIPTION

Figure 1:
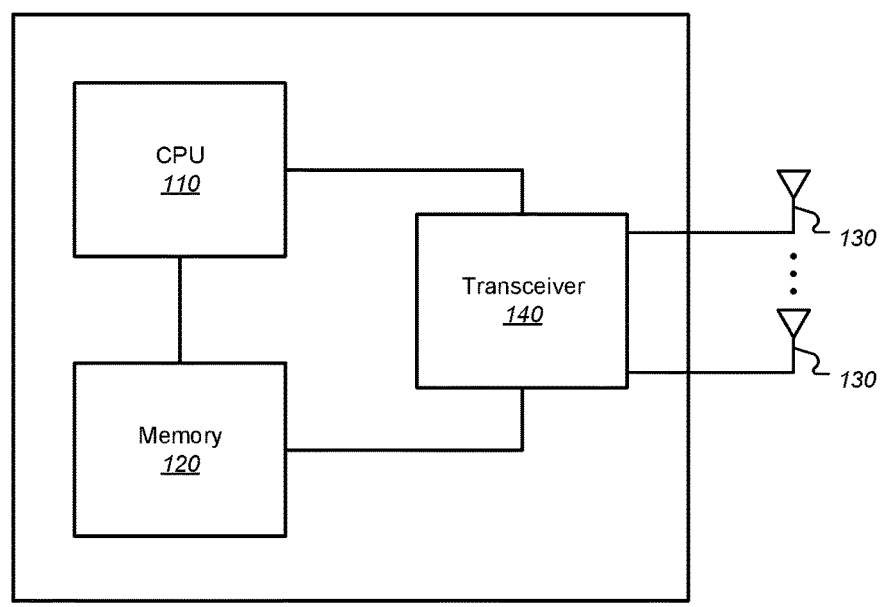
FIG. 1 illustrates an example of a block diagram of a device for processing CPM signals, according to one or more implementations.

Continuous phase modulation (CPM) is a modulation technique in which the phase of the transmit carrier signal is modulated based on information symbols that are to be transmitted to a receiver device. In this context, an information symbol can be one of a pair of values +1 or −1. When CPM is used, a transmitter device uses a pulse shaping filter to ensure a smooth transition of phase and to avoid abrupt changes in it. The pulse shaping filter, which is known to the transmitter as well as the receiver, and the modulation index characterize the frequency spread of the CPM baseband signal. In this context, a CPM baseband signal refers to the analog CPM signal that modulates the carrier frequency.

A CPM baseband signal that is transmitted by a transmitter can be represented as:

$$x(t) = A e^{j(\phi(t))} \tag{1}$$

where the phase of the signal $\phi(t)$ can be given by:

$$\phi(t) = h\pi \left[ \sum_{k=0}^{n-2} I_k + I_{n-1} q(t-(n-1)T) + I_n q(t-nT) \right] \tag{2}$$

$$q(t) = \int_0^t g(\tau) d\tau \tag{3}$$

In equation (1), A is the amplitude of the transmitted CPM baseband signal x(t). In equation (2), h is the modulation index for x(t); $I_k$ is the $k^{th}$ information symbol and T is the time duration for each symbol. In equation (3), g(t) represents the pulse shaping filter.

As shown by equations (1) and (2), the information corresponding to the transmitted information symbols is present in the phase φ(t) of the CPM baseband signal. Accordingly, a receiver decodes the information symbols by processing the phase of the received CPM baseband signal.

In some situations, there can be a non-zero frequency offset between the transmitter and the receiver devices. The frequency offset can be, for example, due to frequency mismatch between the oscillators of the transmitter and the receiver, among other reasons. In some cases, the characteristics of these oscillators can be time varying, thereby causing the frequency offset between the transmitter and the receiver to be time varying. A CPM baseband signal that is received at a receiver when a frequency offset is present can be represented as:

$$r(t)=Ae^{j(\phi(t)+\phi_0+2\pi\int f(t)dt)}+n(t) \quad (4)$$

where r(t) is the received CPM baseband signal; φ(t) is the phase of the CPM signal as transmitted by the transmitter; $\phi_0$ is an initial phase offset; f(t) is frequency offset at time t; and n(t) is additive noise.

Equation (4) indicates that a frequency offset in the received CPM signal can affect the phase of the CPM signal. In such cases, if the receiver decodes the information symbols by processing the phase of the received CPM baseband signal without correcting for the frequency offset, there can be errors in the information symbols obtained by the receiver. The following sections describe components of a receiver device, and associated techniques, which are used to estimate the time varying frequency offset in a CPM baseband signal received at the receiver, so as to adjust (e.g., compensate) the received signal with the estimated frequency offset before decoding information symbols from the phase of the signal. The techniques for frequency offset estimation and compensation are designed to be robust to the additive noise n(t), such that these techniques work well at low SNR levels, and provide improved receiver sensitivity.

In some situations, a transmitter that uses CPM transmits packets using varying modulation index values that are changed from one transmitted packet to a next transmitted packet. In such cases, the receiver may not be aware of the modulation index value used by the transmitter for an incoming packet included in a received CPM baseband signal. If the receiver is able to estimate the modulation index used by the transmitter, then the performance of the receiver can be improved. For example, the techniques for frequency offset estimation and compensation can improve when varying modulation index values used in the received CPM signal, which are unknown to the receiver, are accurately estimated. The following sections describe components of the receiver device, and associated techniques, which are used to estimate the varying modulation index values for incoming packets included in a CPM baseband signal received at the receiver.

In some situations, a CPM baseband signal is corrupted during transmission from the transmitter to the receiver, e.g., due to noise in the transmission channel, or environmental impairments. The following sections describe components of the receiver device, and associated techniques, which are used to decode a corrupted CPM baseband signal that is received at the receiver, and accurately obtain the information symbols encoded in the phase of the signal.

FIG. 1 illustrates an example of a block diagram of a device 100 for processing CPM signals, according to one or more implementations. The device 100 is configured to act as a communications device that can transmit and/or receive CPM signals. In some implementations, the device 100 receives, from another transmitter device, a CPM baseband signal with an unknown frequency offset (e.g., due to a frequency mismatch between the transmitter and the device 100). In such implementations, the device 100 is configured to estimate the frequency offset of the CPM signal, and adjust (e.g., compensate) the received CPM signal using the estimated frequency offset. Additionally or alternatively, in some implementations, the device 100 receives, from a transmitter, a CPM baseband signal that includes varying values of modulation index (e.g., the modulation index values changing from packet to packet included in the CPM signal), that are unknown to the device 100. In such implementations, the device 100 is configured to estimate the modulation index values used in the received CPM signal. Additionally or alternatively, in some implementations, the device 100 receives a CPM baseband signal that is corrupted during transmission. In such implementations, the device 100 is configured to decode information symbols from the phase of the received signal using resource-efficient decoding techniques.

The device 100 includes a central processing unit (CPU) 110, a memory unit 120, a transceiver 140 and one or more antennas 130 that are coupled to the transceiver 140. The CPU 110 can be a general purpose microprocessor, a microcontroller, or other suitable processing unit. In one or more implementations, the CPU 110 controls the transceiver 140 for processing CPM baseband signals that are received at the device 100.

The memory unit 120 can be a flash memory unit, a read-only memory (ROM) unit, a random access memory (RAM) unit, an Electrically Erasable Programmable Read Only Memory (EEPROM) unit, a hard disk, other suitable storage unit, or any combination thereof. The memory unit 120 is configured to store various instructions that are executed by the CPU 110 for performing the operations of the device 100. In some implementations, the memory unit 120 is configured to store instructions that are executed by the CPU 110 for controlling the operations of the transceiver 140. Such instructions can include estimating the frequency offset of a received CPM signal and compensating for the frequency offset; estimating the modulation index values for packet data include in a received CPM signal; or decoding information symbols from a received CPM signal, or any suitable combination of these. In some implementations, the instructions corresponding to the various operations of the transceiver 140 can be encoded in different firmware packages that are stored by the memory unit 120. The different firmware packages can be executed by various circuit components of the transceiver unit, which are described in greater detail in the following sections.

The transceiver 140 is configured to transmit and/or receive communications signals. In some implementations, the transceiver 140 uses CPM techniques for transmitting and/or receiving communications signals. For example, the transceiver 140 receives CPM signals from one or more transmitter devices and processes such signals.

The transceiver 140 interfaces with a wireless communications channel through one or more antennas 130 that are coupled to the transceiver unit. The one or more antennas 130 are configured to process radio frequency (RF) signals that are transmitted or received over the wireless communications channel. The RF signals processed by the antennas 130 include CPM signals that are transmitted and/or received by the transceiver 140. Additionally or alternatively, in some implementations, the transceiver 140 is coupled to a wired communications channel (e.g., a coaxial network cable) through one or more wired network interfaces.

When a CPM signal is received at the transceiver 140, e.g., through the wireless communications channel using the antennas 130, the CPM signal is processed by one or more circuit components included in the transceiver unit. As described in greater detail below, the circuit components are configured to perform various operations to: estimate the frequency offset of the received CPM signal and adjust or compensate for the estimated frequency offset; estimate varying modulation index values for the received CPM signal; or decode information symbols encoded in the phase of the CPM signal, or a suitable combination of these operations. The circuit components include separate hardware circuits, firmware packages, or implemented as software instruction modules executed by the CPU 110, or any suitable combination of these.

In some implementations, the device 100 is a single system-on-a-chip (SoC) with a built-in CPU 110, memory unit 120 and transceiver 140. In other implementations, the device 100 includes the CPU 110, the memory unit 120 and/or the transceiver 140 as separate physical units of the device.

In some implementations, the transceiver 140 in the device 100 is configured to process communication signals using Gaussian Phase Shift Keying (GPSK) modulation, which is a type of CPM. For example, the transceiver 140 can be a Bluetooth™ device that is configured to process Bluetooth's Basic Data Rate (BDR) signals and/or Bluetooth Low Energy (BLE) signals, which use GPSK modulation. Additionally or alternatively, the transceiver 140 is configured to process communication signals that use other forms of CPM, such as Global System for Mobile Communications (GSM™) signals, and/or Institute of Electrical and Electronics Engineers (IEEE) 802.11 Frequency Hopping Spread Spectrum (FHSS) signals, among other suitable signaling schemes. Accordingly, the transceiver 140 can apply the techniques disclosed in this application, e.g., estimating the frequency offset of a received CPM signal and performing CPM signal compensation using the estimated frequency offset, estimating varying modulation index values used in a received CPM signal, or decoding information symbols encoded in the phase of a received CPM signal, to Bluetooth signals, GSM signals, or IEEE 802.11 FHSS signals, among other signal types.

Figure 2:
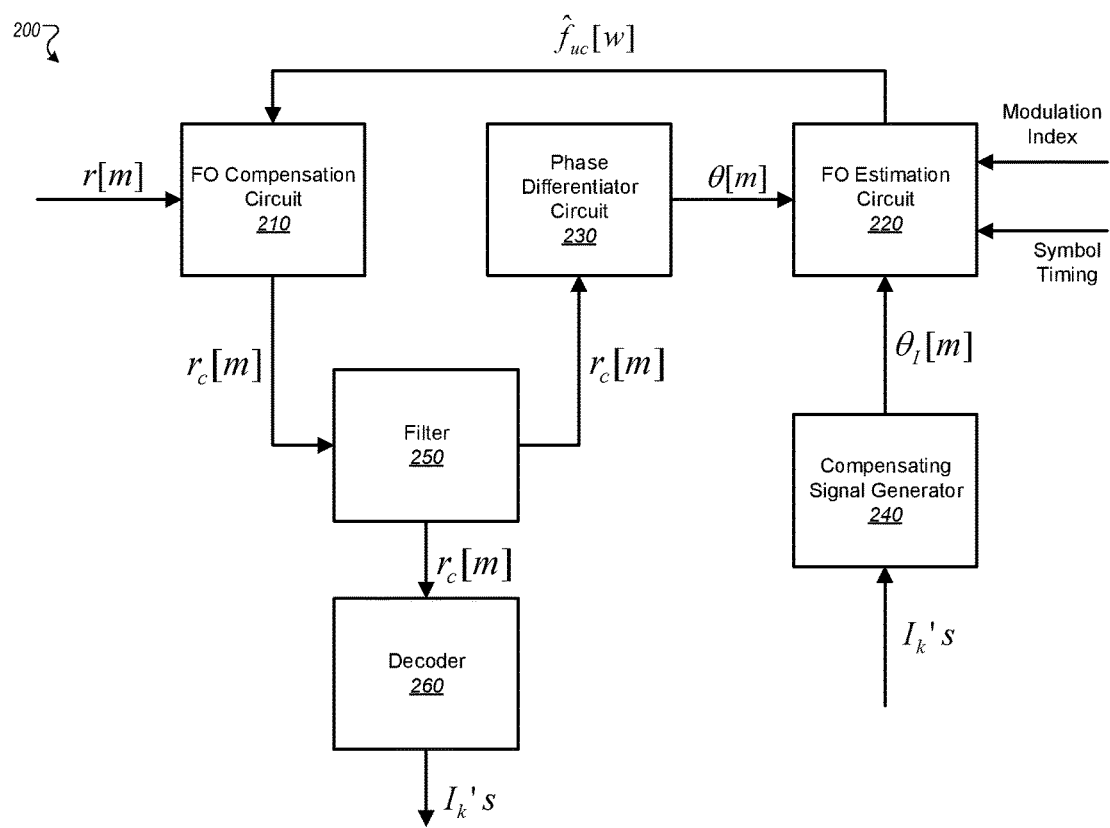
FIG. 2 illustrates an example of a block diagram of circuit components of a transceiver that are used for frequency offset estimation and compensation of a CPM signal, according to one or more implementations.

FIG. 2 illustrates an example of a block diagram of circuit components of a transceiver 200 that are used for frequency offset estimation and compensation of a CPM signal, according to one or more implementations. As shown, the transceiver 200 includes a frequency offset (FO) compensation circuit 210, a frequency offset (FO) estimation circuit 220, a phase differentiator circuit 230, a compensating signal generator circuit 240, a filter 250 and a decoder 260. In some cases, the transceiver 200 is an implementation of the transceiver 140 of the device 100. Accordingly, the following sections describe the transceiver 200 with respect to the components of the device 100.

The FO compensation circuit 210 receives samples r[m] of a CPM baseband signal r(t) that is received at the transceiver 200, where m is the sample index (m being an integer>0), and generates samples $r_c[m]$ that are compensated for estimated frequency offset in the received CPM baseband signal. To do so, the FO compensation circuit 210 takes an uncompensated frequency offset $\hat{f}_{uc}[w]$ computed during a sample window w and generates a frequency offset compensation value $\hat{f}_c[w+1]$ for a sample window w+1 using a programmable multiplier. The FO compensation circuit 210 adjusts (e.g., compensates) the CPM baseband signal in the window w+1 using the frequency offset compensation value $\hat{f}_c[w+1]$.

The phase differentiator circuit 230 receives the adjusted or compensated CPM signal samples $r_c[m]$ through the filter 250, and determines a phase θ[m] of the current signal sample based on the past signal samples. The phase θ[m] is provided to the FO estimation circuit 220.

The FO estimation circuit 220 generates the uncompensated frequency offset $\hat{f}_{uc}[w]$ for the window w based on the phase values θ[m] of different signal samples m received from the phase differentiator 230, and using compensating signal phase values $\theta_I[m]$ provided by the compensating signal generator 240. The FO estimation circuit 220 provides the uncompensated frequency offset $\hat{f}_{uc}[w]$ to the FO compensation circuit 210 through a feedback loop.

The compensating signal generator 240 generates the compensating signal phase values $\theta_I[m]$ based on information symbols $I_k$'s included in the baseband signal. In some implementations, the information symbols are provided to the compensating signal generator 240 by the decoder circuit 260, which obtains the information symbols by decoding the adjusted or compensated baseband signal samples $r_c[m]$ received from the filter 250.

The filter 250 is a low pass filter. In some implementations, the filter 250 is a pulse shaping filter that is configured to filter out abrupt changes in the phase of the received CPM baseband signal, thereby leading to a smooth transition of phase of the received CPM baseband signal. In some implementations, the frequency response of the filter 250 matches the frequency response of a filter that is used by the transmitter device. The following sections describe in greater detail the operations of the circuit components of the transceiver 200 to compensate a CPM baseband signal r(t) received at the transceiver 200.

As indicated above, the transceiver 200 receives a CPM baseband signal r(t) and processes the signal in discrete non-overlapping blocks, which are referred to as windows, e.g., window 1, window 2, . . . , window w, and window w+1, among others. In each window, the transceiver 200 obtains samples r[m] of the signal r(t), e.g., by using a sampling circuit, where m is the sample index (m being an integer>0).

In some implementations, each window is of duration s symbols, e.g., each window corresponds to s symbols encoded in the phase of the CPM signal, where s is an integer greater than 0. In some implementations, s is a programmable positive integer, e.g., the value of s can be set by a user of the device 100. In some implementations, the value of s is in the order of 5 or 6. However, other values of s can also be used.

The time duration of a symbol encoded in the CPM signal, which is also referred to as a symbol duration, is given by T, using a suitable time unit (e.g., milliseconds, microseconds, or nanoseconds). The sampling rate for the signal r(t) is $T_s$, where T is an integer multiple of $T_s$. Accordingly, each window includes $sT/T_s$ samples. In this context, a symbol duration refers to a length of time for which an information symbol is transmitted.

Figure 3A:
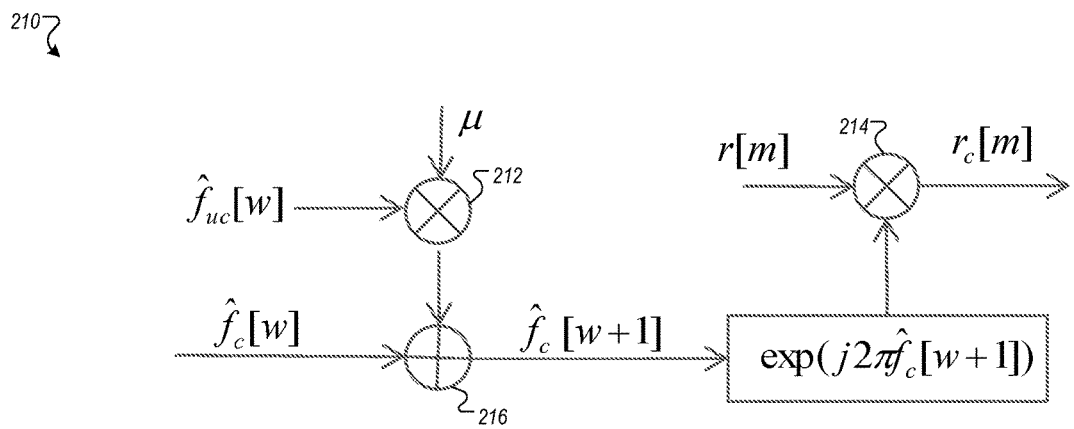
FIGS. 3A and 3B illustrate examples of the circuit structures of the FO compensation circuit and the phase differentiator circuit, respectively, according to one or more implementations.
Figure 3B:
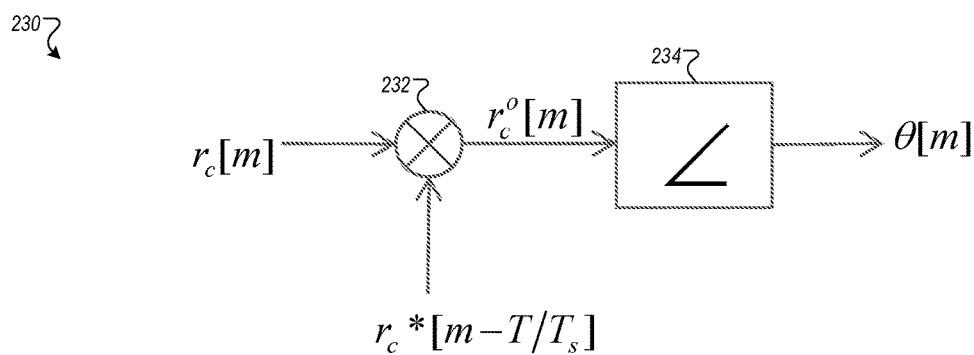

FIGS. 3A and 3B illustrate examples of the circuit structures of the FO compensation circuit 210 and the phase differentiator circuit 230, respectively, according to one or more implementations. As shown in FIG. 3A, the FO compensation circuit 210 includes multiplier circuits 212 and 214, and an adder circuit 216. For a sampling window w+1, the FO compensation circuit 210 receives, as an input provided by the FO estimation circuit 220 through the feedback loop shown in FIG. 2, the uncompensated frequency offset $\hat{f}_{uc}[w]$ that is estimated by the FO estimation circuit 220 for window w. The FO compensation circuit 210 multiplies $\hat{f}_{uc}[w]$ by a multiplier value μ using the multiplier circuit 212. The FO compensation circuit 210 adds, using the adder circuit 216, the output of the multiplier circuit 212, which is the product $\mu\hat{f}_{uc}[w]$, to a compensated frequency offset value $\hat{f}_c[w]$ previously computed for the window w. The result of the addition, which is the output of the adder circuit 216, is the adjusted or compensated frequency offset value $\hat{f}_c[w+1]$ for the window w+1. The above operation of the FO compensation circuit 210 is represented by equation (5).

$$\hat{f}_c[w+1]=\hat{f}_c[w]+\mu\hat{f}_{uc}[w] \quad (5)$$

In some implementations, the multiplier value μ is programmable, e.g., can be set by a user of the device 100. In some implementations, the value of μ ranges between 0 and 1. In some implementations, different values of μ are used for different frequency offsets. For example, in one or more implementations, for slowly varying frequency offset, μ can be in the range of ⅟32, while for fast varying frequency offset μ can be in the range of ¼. However, other values of μ are also possible in other implementations.

The FO compensation circuit 210 computes the phase compensation $\exp(-j2\Xi\hat{f}_c[w+1])$ corresponding to the compensated frequency offset $\hat{f}_c[w+1]$ and uses the multiplier circuit 214 to multiply the uncompensated CPM baseband signal sample r[m] with the phase compensation value $\exp(-j2\Xi\hat{f}_c[w+1])$. The output of the multiplier circuit 214 is the compensated CPM baseband signal sample $r_c[m]$ for the window w+1, which is represented by equation (6).

$$r_c[m] = r[m]e^{-j2\pi\hat{f}_c[w+1]} \quad (6)$$

where $j = \sqrt{-1}$, $ws\frac{T}{T_s} \le m < (w+1)s\frac{T}{T_s}$.

FIG. 3B shows that the phase differentiator circuit 230 includes a multiplier circuit 232 and an angle determiner circuit 234. The phase differentiator circuit 230 receives compensated CPM signal samples $r_c[m]$ from the filter 250, as indicated in FIG. 2. The phase differentiator circuit 230 uses the multiplier circuit 232 to multiply the present input sample $r_c[m]$ continuously with compensated samples $r_c[m-T/T_s]$ received corresponding to the past T symbol duration, to generate the output $r_c^0[m]$, as shown by equation (7).

$$r_c^0[m]=r_c[m]\text{conj}(r_c[m-T/T_s]) \quad (7)$$

In equation (7), conj(x) represents the complex conjugate of x. As described previously, T is the symbol duration and $T_s$ is the sampling rate.

The phase differentiator circuit 230 computes the angle of $r_c^0[m]$ continuously using the angle determiner circuit 234 to obtain the phase $\Pi[m]=\angle r_c^0[m]$. The phase differentiator circuit 230 forwards the phase value $\Pi[m]$ to the FO estimation circuit 220.

The compensating signal generator circuit 240 receives as input the information symbols $I_k$'s that are encoded in the phase of the received CPM baseband signal. The compensating signal generator circuit 240 receives the information symbols from some external sources. As noted previously, in some implementations, the decoder circuit 260 forwards the information symbols to the compensating signal generator circuit 240 after decoding the compensated CPM signal $r_c[m]$, which the decoder 260 receives from the filter 250.

The compensating signal generator circuit 240 generates a compensating signal phase $\theta_I[m]$ for the window w as shown by equation (8).

$$\theta_I[m]=I_{k'-2}\{h\pi-q(T+\tau)\}+I_{k'-1}\{q(T+\tau)-q(\tau)\}+I_{k'}\{q(\tau)\} \quad (8)$$

In equation (8), the sample m corresponds to the window $$(w-1)s\frac{T}{T_s} < m \le ws\frac{T}{T_s}.$$

indicates the index for an information symbol corresponding to which the phase $\Pi[m]$ is determined above, and k' is represented as:

$$k' = \lfloor mT_s/T \rfloor,$$

where $\lfloor x \rfloor$ denotes the greatest integer that is less than x. $\tau=mT_s-k'T$, and q(t) is the signal shaped by the pulse shaping filter used for CPM signaling, e.g., filter 250, and is represented by equation (3).

The FO estimation circuit 220 receives the phase values $\Pi[m]$ from the phase differentiator circuit 230, and the compensating signal phase values $\theta_I[m]$ from the compensating signal generator circuit 240. In addition, the FO estimation circuit 220 receives, from other external sources, the modulation index values used by the transmitter device for the CPM baseband signal. In some implementations, the FO estimation circuit 220 receives the modulation index values from a MI estimation circuit, as described in greater detail in the following sections. The FO estimation circuit 220 is also aware of the symbol timing and symbol duration characteristics, e.g., the circuit 220 receives from an external source information about the boundaries for the windows window 1, window 2, ... window w and window w+1.

The FO estimation circuit 220 estimates a value of the uncompensated frequency offset $\hat{f}_{uc}[w]$ for window w using the phase values $\Pi[m]$ and the compensating signal phase values $\theta_I[m]$ that are obtained for the samples m in the window w. In some implementations, the FO estimation circuit computes $\hat{f}_{uc}[w]$ using a subset of the values of $\Pi[m]$ and $\theta_I[m]$ corresponding to the window w, e.g., phase values determined for a subset of the samples present in the window w. In other implementations, the FO estimation circuit computes $\hat{f}_{uc}[w]$ using all the values of $\Pi[m]$ and $\theta_I[m]$ corresponding to the window w, e.g., phase values determined for all the samples present in the window w.

The FO estimation circuit 220 computes $\hat{f}_{uc}[w]$ by obtaining a difference $\theta[k]-\theta_I[k]$ between each pair of $\Pi[k]$ and $\theta_I[k]$ corresponding to a sample k in the selected group of samples Z for the window w, and adding the differences for each pair. The summation $$\sum_{k \in Z}(\theta[k] - \theta_I[k])$$

of the phase differences is converted into a frequency offset by dividing by 2ΞT corresponding to the number of samples Z selected for the window w. The above operation to compute $\hat{f}_{uc}[w]$ is represented by equation (9).

$$\hat{f}_{uc}[w] = \frac{\sum_{k \in Z}(\theta[k] - \theta_I[k])}{2\pi T \left(\sum_{k \in Z} 1\right)} \quad (9)$$

In equation (9), Z represents a subset of the number of samples in the window w, which are selected for consideration to compute $\hat{f}_{uc}[w]$, as described above. Z can be represented by equation (10).

$$Z \subseteq \left\{(w-1)s\frac{T}{T_s}, (w-1)s\frac{T}{T_s}-1, (w-1)s\frac{T}{T_s}-2, \ldots, ws\frac{T}{T_s}-1\right\} \quad (10)$$

As noted above, in some implementations, Z is a proper subset of the number of samples in the window w, while in other implementations, Z is the full set of the samples in the window w.

In the manner described above, the transceiver 200 uses various circuit components to estimate frequency offset for a received CPM baseband signal, and uses the estimated value of the frequency offset to compensate for the frequency mismatch between the transmitter and the receiver. The above-disclosed techniques can help in precisely estimating the time varying frequency offset in the received signal for low SNRs. Compensating the received CPM signal with the estimated frequency offset can also lead to significant improvement in receiver sensitivity and the decoding ability of the transceiver 200.

As noted previously, in some situations, transmitters use varying modulation index h values for different packets that are transmitted as part of a CPM signal. In some implementations, for an incoming packet, the receiver, e.g., the transceiver 200 in the device 100, does not know apriori the actual value of the modulation index used by the transmitter to transmit the packet using CPM modulation. In such implementations, the transceiver 200 estimates the modulation index values used by the transmitter, as described in the following sections.

Figure 4:
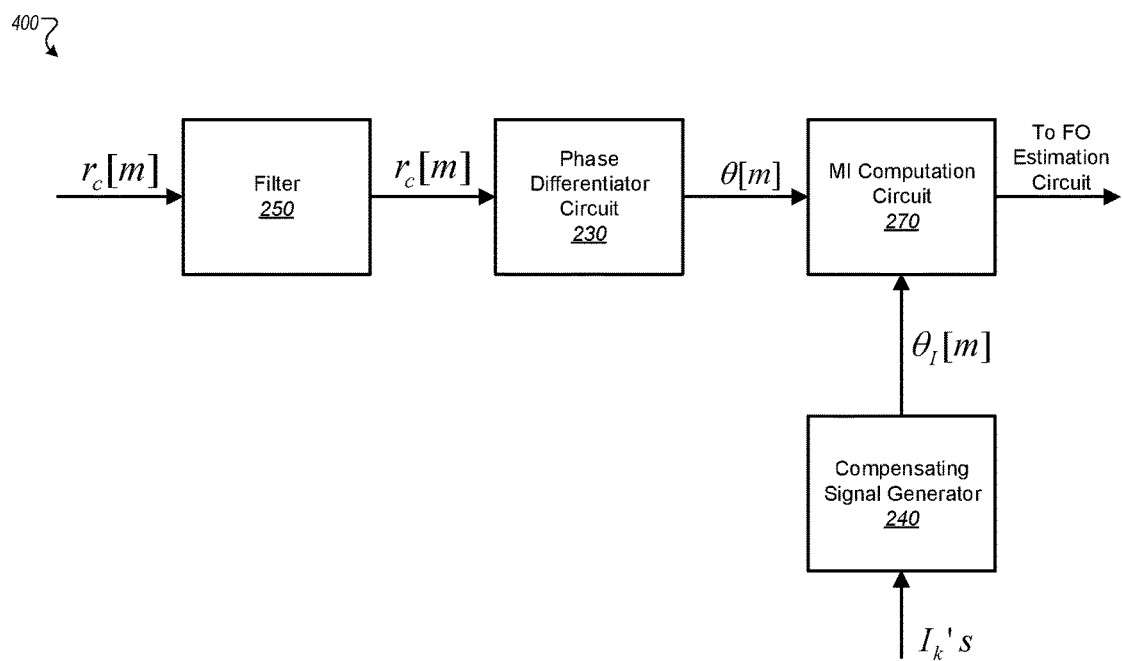
FIG. 4 illustrates an example of a block diagram of circuit components of a transceiver that are used to estimate modulation index values for a received CPM signal, according to one or more implementations.

FIG. 4 illustrates an example of a block diagram of circuit components of a transceiver 400 of the device 100 that are used to estimate modulation index values for a received CPM signal, according to one or more implementations. In some cases, the transceiver 400 is an implementation of the transceiver 140 of the device 100. Accordingly, the following sections describe the transceiver 400 with respect to the components of the device 100.

In some implementations, the transceiver 400 can include components that are the same as the components of transceiver 200, which are described above in connection with FIG. 2, but transceiver 400 also includes additional components that are now described in detail. For example, as shown, the transceiver 400 includes the phase differentiator circuit 230, the compensating signal generator circuit 240, the filter 250 and a modulation index (MI) computation circuit 270 for estimating modulation index values.

The phase differentiator circuit 230 receives the compensated CPM signal samples $r_c[m]$ from the filter 250, determines phase values $\theta[m]$ corresponding to the signal samples, and forwards the determined phase values $\theta[m]$ to the MI computation circuit 270. As described previously, the phase differentiator circuit 230 uses the multiplier circuit 232 to multiply a present input sample $r_c[m]$ continuously with compensated samples $r_c[m-T/T_s]$ received corresponding to the past T symbol duration, to generate the output $r_c^0[m]$, which is shown by equation (7) described previously and reproduced below.

$$r_c^0[m] = r_c[m]\text{conj}(r_c[m-T/T_s]) \quad (7)$$

In equation (7), conj(x) represents the complex conjugate of x. As described previously, T is the symbol duration and $T_s$ is the sampling rate.

The phase differentiator circuit 230 computes the angle of $r_c^0[m]$ continuously using the angle determiner circuit 234 to obtain the phase $\Pi[m] = \angle r_c^0[m]$. For the modulation index estimation operation, the phase differentiator circuit 230 computes N such values of $\Pi[m]$, where $q < m \leq q+N$, N and q being integers. The phase differentiator circuit 230 forwards the N phase values $\Pi[m]$ values to the MI computation circuit 270.

In some implementations, the value of N is programmable, e.g., N can be set to a suitable value by a user of the device 100. For example, the value of N can be set to 48. However, other suitable values of N are also possible. The value of q is based on a starting sample from which the modulation index values are to be estimated. For example, a user can estimate modulation index values starting from the first sample, e.g., m=1. In such implementations, q=0 and $0 < m \leq N$. However, in other implementations where the modulation index values are estimated starting at a higher sample number, q>0. For example, q can be 1 or a greater integer value.

As described previously, the compensating signal generator circuit 240 receives as input the information symbols $I_k$'s that are encoded in the phase of the received CPM baseband signal. For the modulation index estimation operations, the compensating signal generator circuit 240 generates N values of compensating signal phase $\theta_I[m]$ as shown by equation (11).

$$\theta_I[m] = I_{k'-2}\{\pi - (T+\tau)\} + I_{k'-1}\{q_n(T+\tau) - q(\tau)\} + I_{k'}\{q_n(\tau)\} \quad (11)$$

In equation (11), the sample m corresponds to $q < m \leq q+N$. k' indicates the index for an information symbol corresponding to which the phase $\Pi[m]$ is determined above, and k' is represented as:

$$k' = \lfloor mT_s/T \rfloor,$$

where $\lfloor x \rfloor$ denotes the greatest integer that is less than x. $\tau = mT_s - k'T$, and $q_n(t)$ is the signal shaped by the pulse shaping filter used for CPM signaling, e.g., filter 250, such that the modulation index for the signal is normalized to 1. The compensating signal generator 240 forwards the N compensating signal phase values $\theta_I[m]$ to the MI computation circuit 270.

The MI computation circuit 270 receives the phase values $\theta[m]$ of N signal samples m from the phase differentiator 230, and N compensating signal phase values $\theta_I[m]$ provided by the compensating signal generator 240. The MI computation circuit 270 estimates modulation index values for incoming packets in the received CPM signal based on the input phase values, as described below.

In some implementations, for each sample m, the MI computation circuit 270 multiplies the phase values $\theta[m]$ with the compensating signal phase value $\theta_I[m]$. The MI computation circuit 270 sums the resulting product $\theta[m]\theta_I[m]$ over the N samples to obtain the summation $$\sum_{m=1}^{N} \theta[m]\theta_I[m],$$

which represents a measure of correlation between the expected ideal phase of the received signal and the actual phase of the received signal. Additionally, for each sample m, the MI computation circuit 270 obtains a square of each compensating signal phase value $\theta_I[m]$, and sums the resulting squared values $\theta_I^2[m]$ over the N samples to obtain the summation $$\sum_{m=1}^{N} \theta_I^2[m],$$

which is a normalizing term. The MI computation circuit divides the summation $$\sum_{m=1}^{N} \theta[m]\theta_I[m]$$

by the summation $$\sum_{m=1}^{N} \theta_I^2[m]$$

to obtain an estimated value $\hat{h}$ of the modulation index, as shown by equation (12).

$$\hat{h} = \frac{\sum_{m=1}^{N} \theta[m]\theta_I[m]}{\sum_{m=1}^{N} \theta_I^2[m]} \quad (12)$$

The MI computation circuit 270 performs the operations represented by equation (12) to estimate the modulation index values in cases where there is no frequency offset between the transmitter and the receiver (e.g., transceiver 400), or when the frequency offset between the transmitter and the receiver is known. However, in some implementations, the frequency offset that is present between the transmitter and the receiver is not known. In such implementations, the MI computation circuit 270 estimates modulation index values using the following operations. Additionally, the MI computation circuit 270 can estimate the frequency offset, as described below.

For each sample m, the MI computation circuit 270 multiplies the phase values $\theta[m]$ with the compensating signal phase value $\theta_I[m]$. The MI computation circuit 270 sums the resulting product $\theta[m]\theta_I[m]$ over the N samples to obtain the summation $$\sum_{m=1}^{N} \theta[m]\theta_I[m],$$

and scales the summation by a factor N to compute the value $$N\sum_{m=1}^{N} \theta[m]\theta_I[m].$$

The MI computation circuit 270 sums the N phase values $\theta[m]$ to obtain summation $$\sum_{m=1}^{N} \theta[m],$$

and further sums the N compensating signal phase value $\theta_I[m]$ to obtain summation $$\sum_{m=1}^{N} \theta_I[m].$$

The MI computation circuit 270 multiplies $$\sum_{m=1}^{N} \theta[m]$$

with $$\sum_{m=1}^{N} \theta_I[m]$$

to compute the value $$\sum_{m=1}^{N} \theta[m]\sum_{m=1}^{N} \theta_I[m].$$

Additionally, for each sample m, the MI computation circuit 270 obtains a square of each compensating signal phase value $\theta_I[m]$, and sums the resulting squared values $\theta_I^2[m]$ over the N samples to obtain the summation $$\sum_{m=1}^{N} \theta_I^2[m],$$

which is scaled by the factor N to obtain $$N\sum_{m=1}^{N} \theta_I^2[m].$$

The MI computation circuit also squares the summation $$\sum_{m=1}^{N} \theta_I[m]$$

to obtain the value $$\left[\sum_{m=1}^{N} \theta_I[m]\right]^2.$$

Following the operations above, the MI computation circuit 270 divides a difference of the values $$N \sum_{m=1}^{N} \theta[m]\theta_I[m]$$

and $$\sum_{m=1}^{N} \theta[m] \sum_{m=1}^{N} \theta_I[m]$$

by a difference of the values $$N \sum_{m=1}^{N} \theta_I^2[m]$$

and $$\left[\sum_{m=1}^{N} \theta_I[m]\right]^2$$

to obtain an estimated value $\hat{h}$ of the modulation index, as shown by equation (13).

$$\hat{h} = \frac{N \sum_{m=1}^{N} \theta[m]\theta_I[m] - \sum_{m=1}^{N} \theta[m] \sum_{m=1}^{N} \theta_I[m]}{N \sum_{m=1}^{N} \theta_I^2[m] - \left[\sum_{m=1}^{N} \theta_I[m]\right]^2} \quad (13)$$

In some implementations, the MI computation circuit 270 provides the estimated modulation index values $\hat{h}$ to the FO estimation circuit 220, for use in estimating the uncompensated frequency offset $\hat{f}_{uc}[w]$, as described previously.

Additionally, in some implementations, to compute an estimate of the frequency offset, the MI computation circuit 270 multiplies $$\left[\sum_{m=1}^{N} \theta_I[m]\right]^2$$

and the summation $$\sum_{m=1}^{N} \theta[m],$$

which are computed as described above, to obtain the product value $$\left[\sum_{m=1}^{N} \theta_I[m]\right]^2 \sum_{m=1}^{N} \theta[m].$$

The MI computation circuit 270 further multiples the summation $$\sum_{m=1}^{N} \theta[m]\theta_I[m]$$

with the summation $$\sum_{m=1}^{N} \theta_I[m]$$

to obtain the product value $$\sum_{m=1}^{N} \theta[m]\theta_I[m] \sum_{m=1}^{N} \theta_I[m].$$

Following the above operations, the MI computation circuit 270 divides a difference of product the values $$\left[\sum_{m=1}^{N} \theta_I[m]\right]^2 \sum_{m=1}^{N} \theta[m]$$

and $$\sum_{m=1}^{N} \theta[m]\theta_I[m] \sum_{m=1}^{N} \theta_I[m]$$

by a difference of the values $$N \sum_{m=1}^{N} \theta_I^2[m]$$

and $$\left[\sum_{m=1}^{N}\theta_I[m]\right]^2$$

to obtain an estimate $F_O$ of the frequency offset, as shown by equation (14).

$$F_o = \frac{\left[\sum_{m=1}^{N}\theta_I[m]\right]^2 \sum_{m=1}^{N}\theta[m] - \sum_{m=1}^{N}\theta[m]\theta_I[m]\sum_{m=1}^{N}\theta_I[m]}{N\sum_{k=1}^{N}\theta_I^2[m] - \left[\sum_{m=1}^{N}\theta_I[m]\right]^2} \quad (14)$$

In the manner described above, the transceiver 400 uses various circuit components to estimate modulation index values for a received CPM baseband signal when transmitter uses varying modulation index values in the CPM signal that are not known to the transceiver. The above disclosed techniques can help in improving the receiver sensitivity of the transceiver 400, and reducing error flowing in BER and PER performance, as noted previously. For example, upon using the above operations to estimate modulation index values, the sensitivity of the transceiver can improve by an order of 0.5 decibels or more.

As noted previously, in some situations, a CPM signal that is received at the device 100 is corrupted during transmission from a transmitter, e.g., due to noise in the transmission channel, or environmental impairments. In such cases, as described in the following sections, the transceiver 140 in the device 100 can use a resource-efficient decoding technique to decode the corrupted CPM baseband signal that is received, and accurately obtain the information symbols encoded in the phase of the CPM signal. As described previously, the transceiver 200 is an example of the transceiver 140 in some implementations. Accordingly, the following sections describe the decoding operations with respect to the transceiver 200.

In some implementations, the transceiver 200 uses the decoding circuit 260 to perform the decoding operations. The following sections describe the decoder 260 performing the decoding operations to decode n−1 information symbols, which are represented as $I_m$, where k≤m≤k+n−1, with k, l and m being integers. However, the operations are also applicable to decode other information symbols.

To decode the $I_m$ information symbols, the decoder 260 processes the received CPM baseband signal r(t) for the duration kT<t≤(k+n)T, where T is a symbol duration, as described previously. As an initial operation, the decoder 260 generates a number digital signals as elements of an array of correlation signals, where the array is referred to as corr_sig_array. Each digital signal element of the corr_sig_array is generated to be of length $T/T_s$ samples. As described previously, $T_s$ is the sampling rate of r(t). In some implementations, the decoder 260 generates four elements for the corr_sig_array. Each element of corr_sig_array is generated as shown in equation (15).

corr_sig_array[corr_no,idx]=$e^{j[2\pi h I_{l-1}q[(idx)T_s+T)]+2\pi h I_q[(idx)T_s)]]}$ (15)

Considering the case where four digital signals are generated, 0≤corr_no<3 and 0≤idx<T/$T_s$. In equation (15), corr_no denotes one of the corr_sig_array signals that is addressed, while idx indicates a sample of a particular digital signal element of the corr_sig_array.

In some implementations, four digital signal elements are generated for the corr_sig_array, since for a given corr_no, the information symbol pair $\{I_l, I_{l-1}\}$ can hold one of four values, as shown by Table I. The following sections describe the operations of the decoder 260 by considering the corr_sig_array as including four digital signal elements.

TABLE 1

| corr_no | $I_{l-1}$ | $I_l$ |
|---------|-----------|-------|
| 0 | −1 | −1 |
| 1 | −1 | 1 |
| 2 | 1 | −1 |
| 3 | 1 | 1 |

Following the generation of the corr_sig_array, while receiving the CPM baseband signal r(t) for a first symbol duration kT<t≤(k+1)T that is considered for decoding the information symbols, the decoder correlates samples r[m] of the CPM signal with each of the digital signal elements of corr_sig_array to generate a branch matrix, bm_acc_array, as shown by equation (16).

bm_acc_array[corr_no] = (16)

$$\sum_{idx=0}^{T/T_s-1} r[kT/T_s + idx] * conj(\text{corr\_sig\_array}(\text{corr\_no}, idx))$$

In equation (16), conj(x) represents the complex conjugate of x. In some implementations, the decoder correlates compensated samples $r_c[m]$, which are compensated for frequency offset between the transmitter of the CPM signal and the transceiver 200, as described previously, e.g., by the FO compensation circuit 210. The correlation values of a sample r[m] with the elements of the corr_sig_array are stored as elements of the branch matrix bm_acc_array, as shown by equation (16). Since four digital signal elements of corr_sig_array are correlated, four resulting correlation values are stored in the branch matrix.

The decoder 260 creates two cost matrices, new_c_array and old_c_array, and stores the branch matrix values computed above in the two cost matrices, as shown by equation (17). Since initially four correlation values are generated for the branch matrix, each of new_c_array and old_c_array includes four elements.

new_c_array[i]=old_c_array[i]=bm_acc_array[i] (17)

where 0≤i<3. In the following sections, the elements of the cost matrices new_c_array and old_c_array are referred to as states of the cost matrices, and denoted by st.

Subsequently, for the next symbol duration (k+1)T<t≤(k+2)T, the decoder correlates samples r[m] of the CPM signal with each of the four digital signal elements of corr_sig_array to generate new values for the elements of the branch matrix bm_acc_array, as shown by equation (16). At time t=(k+2)T, the decoder regenerates the cost matrix new_c_array based on the correlation values of the samples previously stored in the cost matrix old_c_array, and using the newly generated branch matrix values, as shown by equation (18).

new_c_array[st]=[old_c_array[⌊st/2⌋]+bm_acc_array[st%4]]$e^{j\pi h(I_w)}$ (18)

where ⌊x⌋ denotes the largest integer less than or equal to x, a % b denotes the remainder after a is divided by b, and 0≤st<8. The value of $I_w$ is set as shown by equation (19).

$$I_w = \begin{cases} -1 & \text{if}(st\ \%4) = 0 \text{ or } 1 \\ +1 & \text{if}(st\ \%4) = 2 \text{ or } 3 \end{cases} \quad (19)$$

As shown by equation (18), in regenerating the cost matrix new_c_array, the decoder considers a limited number of states of the cost matrix that were previously computed, indicated by the operation $\lfloor st/2 \rfloor$. In this manner, by limiting the number of previously stored states that are considered to generate the cost matrix new_c_array, the computational complexity of the decoding technique can be limited, compared to other techniques where all previously stored states are used. Accordingly, the decoder 260 can perform the decoding operations in a resource-efficient manner.

Following the regeneration of new_c_array, the cost matrix old_c_array is also regenerated based on the updated states of new_c_array, as shown by equation (20).

$$\text{old\_c\_array}[i] = \text{new\_c\_array}[i] \quad (20)$$

where $0 \le i < 8$. As indicated by equations (19) and (20), following the regeneration of the cost matrices at $t=(k+2)T$ for the new symbol duration, each of new_c_array and old_c_array includes eight states.

The decoder applies the above operations iteratively after every symbol duration T. Since additional information symbols can be present in a new symbol duration that is considered, the number of states of new_c_array and old_c_array are increased following regeneration for each new symbol duration that is considered. Since each new information symbol can take one of two values (e.g., +1 or −1), the number of states increases by a factor of 2 after each symbol duration is processed. Accordingly, at time $t=(k+s_0)T$, where $s_0 < n$, old_c_array includes $2^{s_0+1}$ states. Subsequently, in the symbol duration $(k+s_0)T < t \le (k+s_0+1)T$, the decoder 260 correlates the samples $r[m]$ of the CPM baseband signal with each of the four digital signal elements of corr_sig_array to generate new values for the elements of branch matrix bm_acc_array, as shown by equation (21).

$$\text{bm\_acc\_array}[\text{corr\_no}] = \sum_{idx=0}^{T/T_s - 1} y[(k+s_0)T/T_s + idx] * \text{conj}(\text{corr\_sig\_array}(\text{corr\_no}, idx)) \quad (21)$$

The decoder 260 regenerates the cost matrix new_c_array based on the states previously stored in the cost matrix old_c_array, and using the newly generated branch matrix values, as shown by equation (18). However, in this case, $0 \le st < 2^{(s_0+2)}$, since the number of states for the cost matrix has increased to $2^{s_0+2}$. Subsequently, the cost matrix old_c_array is also regenerated based on the updated states of new_c_array, as shown by equation (20), but with $0 \le i < 2^{s_0+2}$. Accordingly, at $t=(k+s_0+1)T$, each of new_c_array and old_c_array includes $2^{s_0+2}$ states.

The decoder 260 performs the iterative operations described in the previous sections till the end of the period $kT < t \le (k+n)T$ is reached. Following the above operations, at time $t=(k+n)T$, the samples in the symbol durations corresponding to the period $kT < t \le (k+n)T$ have been processed, and new_c_array includes $2^{n+2}$ states. The decoder 260 then reads the values of the $2^{n+2}$ states included in new_c_array, and identifies the state for which the magnitude of the state value satisfies a predetermined relationship to the values of other states in new_c_array. For example, in some implementations, the decoder 260 identifies the state for which the magnitude of the state value is maximum. In other implementations, the decoder 260 identifies the state for which the magnitude of the state value is minimum.

Considering the implementations in which the decoder 260 identifies the state corresponding to which the magnitude of the state value is maximum in new_c_array, the decoder 260 obtains the state number $st_{max}$, e.g., the index of the row in new_c_array, corresponding to the maximum value of the state out of the $2^{n+2}$ states included in new_c_array at time $t=(k+n)T$. The decoder converts $st_{max}$ from a decimal value to a binary string. The decoder 260 decodes the information symbols based on the bits in the binary string. For example, in some implementations, the decoder 260 reads the second to $n^{th}$ bits of the binary string as the (n−1) information symbols $I_{k+1}, I_{k+2}, \ldots, I_{k+n+1}$. Accordingly, if the bits of the binary form of $st_{max}$ are represented as $b_{n+1}, b_n, b_{n-1}, \ldots, b_2, b_1$ and $b_0$, where $b_{n+1}$ is the most significant bit (MSB) and $b_0$ is the least significant bit (LSB), then the decoded information symbols can be represented as $I_{k+m} = b_m$, where $1 \le m \le n-1$. In some other implementations, a different number of bits of the binary string are decoded as the information symbols, or the bits of the binary string are mapped to different information symbols than the above. In some implementations, the decoder 260 performs additional processing operations on the bits of the binary string and obtains the information symbols based on the result of the additional processing operations.

In the manner described above, the transceiver 200 uses the decoder 260 to accurately determine information symbols that are encoded in a received CPM signal, where the CPM signal may be corrupted by noise during transmission. The decoder 260 removes intersymbol interferences (ISI) by correlating the samples in one symbol duration with the symbols in the next symbol duration, using the corr_sig_array elements as described above. By limiting the number of previously computed states that are considered in regenerating the cost matrix for the symbol states, the computational overhead of the decoding operation can be limited, such that the operations are performed in a resource-efficient manner.

Figure 5:
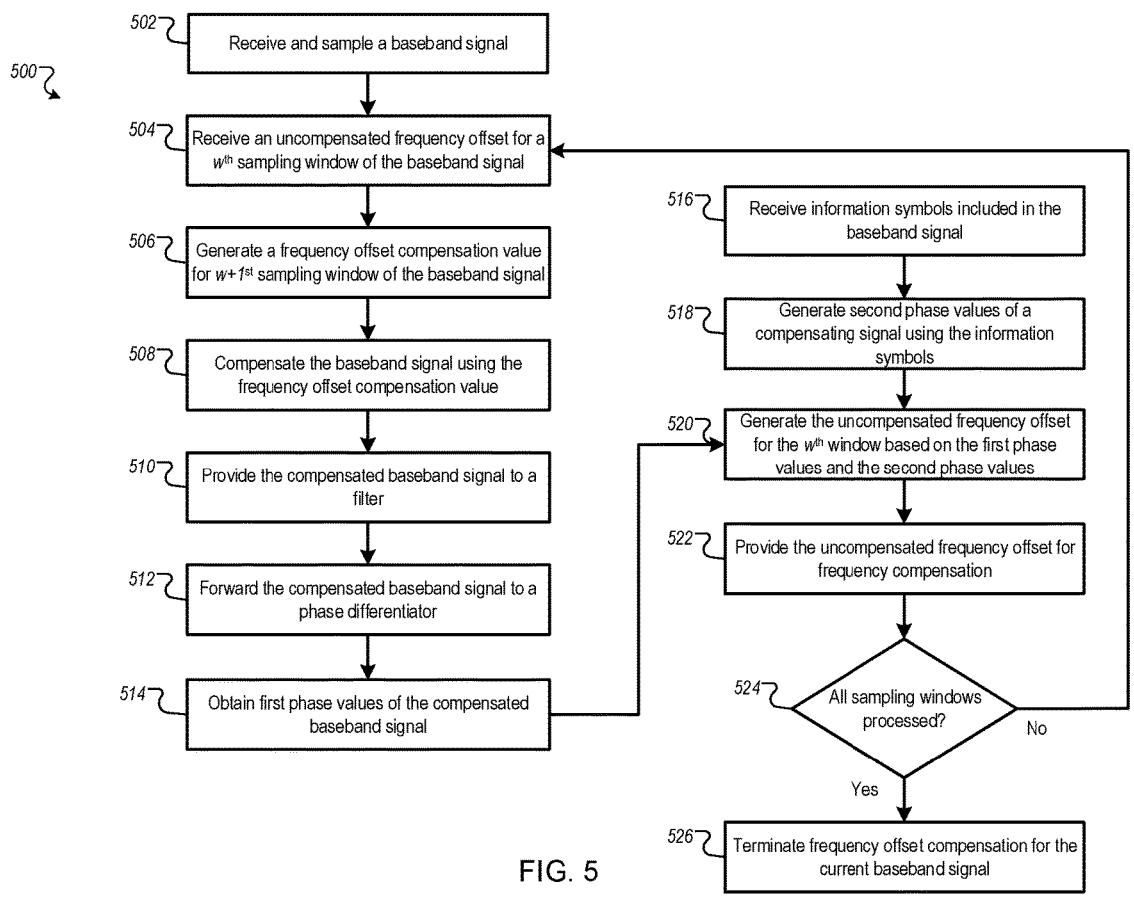
FIG. 5 illustrates an example of a process for frequency offset compensation of a received CPM signal, according to one or more implementations.

FIG. 5 illustrates an example of a process 500 for performing frequency offset compensation of a received CPM signal, according to one or more implementations. The process 500 can be performed by a transceiver, e.g., the transceiver 140 of the device 100, when the transceiver receives a CPM baseband signal from another transmitter device. As described previously, the transceiver 200 is an example of the transceiver 140 in some implementations. Accordingly, the following sections describe the process 500 with respect to the transceiver 200. However, the process 500 also may be performed by other suitable devices.

In some implementations, the process 500 is performed by one or more processors associated with the transceiver 200, which execute instructions stored in memory coupled to the transceiver. For example, the CPU 110 can execute instructions stored in the memory 120 to perform the operations corresponding to the circuit components of the transceiver 200 for frequency offset compensation.

At 502, a baseband signal is received and sampled. For example, the transceiver 200 receives a CPM baseband signal $r(t)$. The transceiver 200 processes the CPM signal in discrete non-overlapping blocks or windows, e.g., window 1, window 2, . . . , window w, and window w+1, among others. In each window, the transceiver 200 obtains samples $r[m]$ of the signal $r(t)$.

At 504, an uncompensated frequency offset for a $w^{th}$ sampling window of the baseband signal is received. For example, the FO compensation circuit 210 receives, from the FO estimation circuit 220, the uncompensated frequency offset $\hat{f}_{uc}[w]$ that is estimated by the FO estimation circuit 220 for the window w.

At 506, a frequency offset compensation value for the w+1$^{st}$ sampling window of the baseband signal is generated. For example, the FO compensation circuit 210 multiplies the uncompensated frequency offset $\hat{f}_{uc}[w]$ by the multiplier value µ using the multiplier circuit 212. The FO compensation circuit 210 adds the output $\mu\hat{f}_{uc}[w]$ of the multiplier circuit 212 to a compensated frequency offset value $\hat{f}_c[w]$ previously computed for the window w, using the adder circuit 216. The output of the adder circuit 216 is the compensated frequency offset value $\hat{f}_c[w+1]$ for the window w+1, as described with respect to equation (5).

At 508, the baseband signal is compensated using the frequency offset compensation value. For example, the FO compensation circuit 210 computes the value exp(j2Ξ$\hat{f}_c$[w+1]) and uses the multiplier circuit 214 to multiply the uncompensated CPM baseband signal sample r[m] with the computed value exp(j2Ξ$\hat{f}_c$[w+1]). The output of the multiplier circuit 214 is the compensated CPM baseband signal sample $r_c$[m] for the window w+1, as described with respect to equation (6).

At 510, the compensated baseband signal is provided to a filter. For example, the FO compensation circuit 210 forwards the compensated CPM baseband signal samples $r_c$[m] to the filter 250.

At 512, the compensated baseband signal is forwarded to a phase differentiator. For example, the filter 250 forwards the compensated CPM baseband signal samples $r_c$[m] to the phase differentiator circuit 230. Additionally, in some implementations, the filter 250 forwards the compensated CPM baseband signal samples $r_c$[m] to the decoder 260.

At 514, first phase values of the compensated baseband signal are obtained. For example, the phase differentiator circuit 230 uses the multiplier circuit 232 to multiply the present input sample $r_c$[m] continuously with compensated samples $r_c$[m–T/$T_s$] received corresponding to the past T symbol duration, to generate the output $r_c^0$[m], as described with respect to equation (7). Subsequently, the phase differentiator circuit 230 computes the angle of $r_c^0$[m] continuously using the angle determiner circuit 234 to obtain the phase Π[m]=∠$r_c^0$[m]. The phase differentiator circuit 230 forwards the phase Π[m] to the FO estimation circuit 220.

At 516, information symbols included in the baseband signal are received. For example, the compensating signal generator circuit 240 receives as input the information symbols $I_k$'S that are encoded in the phase of the received CPM baseband signal. In some implementations, the decoder circuit 260 forwards the information symbols to the compensating signal generator circuit 240 after decoding the compensated CPM signal $r_c$[m], which the decoder 260 receives from the filter 250.

At 518, second phase values of a compensating signal are generated using the information symbols. For example, the compensating signal generator circuit 240 generates a compensating signal phase $\theta_I$[m] for the window w based on the information symbols $I_k$'s, as described with respect to equation (8). The compensating signal generator 240 forwards the compensating signal phase values $\theta_I$[m] to the FO estimation circuit 220.

At 520, the uncompensated frequency offset for the w$^{th}$ window is generated based on the first phase values and the second phase values. For example, the FO estimation circuit 220 receives the phase values Π[m] from the phase differentiator circuit 230, and the compensating signal phase values $\theta_I$[m] from the compensating signal generator circuit 240. The FO estimation circuit 220 also receives, from other external sources, the modulation index values used by the transmitter device for the CPM baseband signal. In some implementations, the FO estimation circuit 220 receives estimated modulation index values from an MI estimation circuit. The FO estimation circuit 220 also receives the symbol timing characteristics. The FO estimation circuit 220 computes an estimated value of the uncompensated frequency offset $\hat{f}_{uc}$[w] for window w using the phase values Π[m] and the compensating signal phase values $\theta_I$[m], as described with respect to equation (9).

At 522, the uncompensated frequency offset is provided for frequency compensation. For example, the FO estimation circuit 220 forwards the estimated value of the uncompensated frequency offset $\hat{f}_{uc}$[w] for the window w to the FO compensation circuit 210 through the feedback loop. The FO compensation circuit 210 uses $\hat{f}_{uc}$[w] to compensate for the frequency offset in the CPM baseband signal for the window w+1 as described above with respect to 504, 506 and 508.

At 524, a determination is made whether all sampling windows have been processed. For example, the transceiver 200 checks if there are additional samples of the baseband signal for which frequency offset compensation has not been performed.

If a determination is made at 524 that not all sampling windows have been processed, then the process 500 returns to 504 to perform frequency offset compensation for the remaining sampling windows of the baseband signal. On the other hand, if a determination is made at 524 that all sampling windows have been processed, then at 526 the frequency offset compensation for the current baseband signal is terminated, until a next baseband signal is received. For example, the transceiver 200 stops performing further frequency offset compensation on the currently received baseband signal. However, the transceiver 200 performs the process 200 again when a new CPM baseband signal is received.

Figure 6:
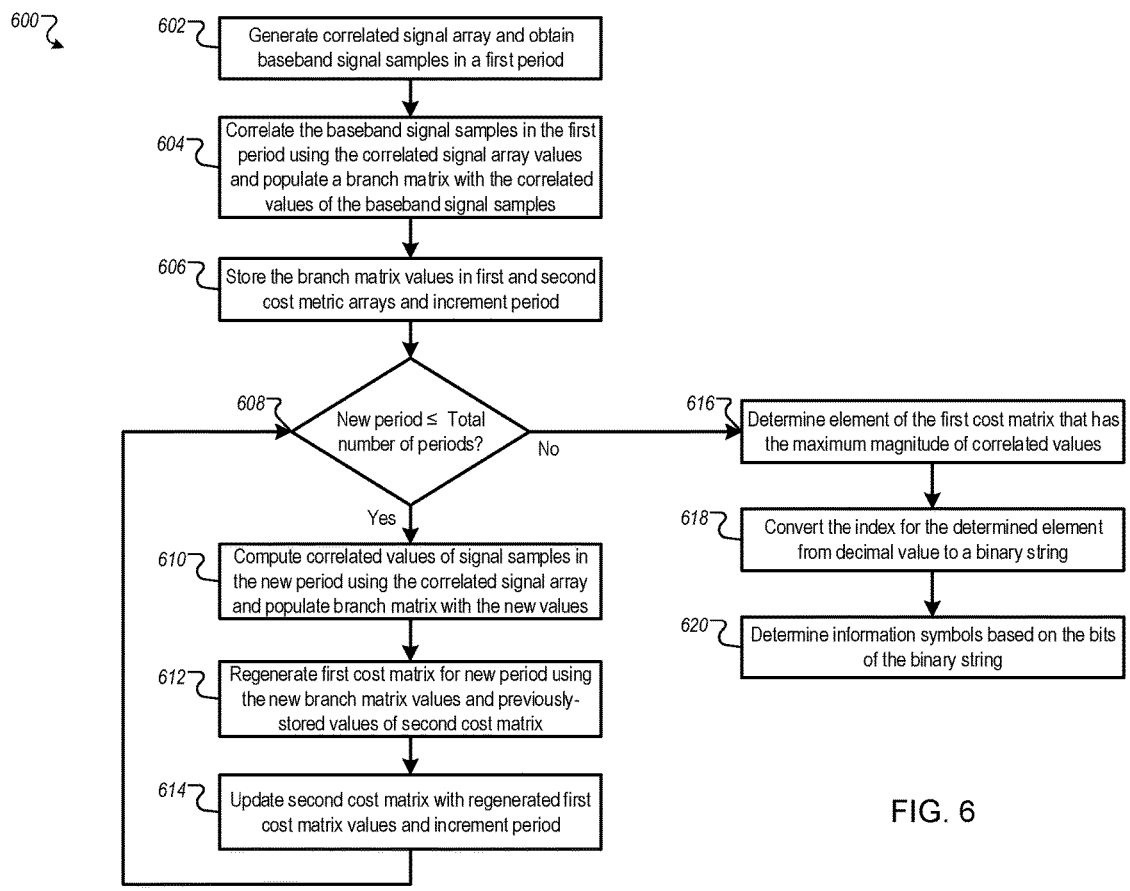
FIG. 6 illustrates an example of a process for decoding information symbols that are encoded in a received CPM signal, according to one or more implementations.

FIG. 6 illustrates an example of a process 600 for decoding information symbols that are encoded in a received CPM signal, according to one or more implementations. The process 600 can be performed by a transceiver, e.g., the transceiver 140 of the device 100, when the transceiver receives a CPM baseband signal from another transmitter device. As described previously, the transceiver 200 is an example of the transceiver 140 in some implementations. Accordingly, the following sections describe the process 600 with respect to the transceiver 200. However, the process 600 also may be performed by other suitable devices.

In some implementations, the process 600 is performed by one or more processors associated with the transceiver 200, which execute instructions stored in memory coupled to the transceiver. For example, the CPU 110 can execute instructions stored in the memory 120 to perform the operations corresponding to the circuit components of the transceiver 200 for decoding the information symbols.

At 602, a correlated signal array is generated and baseband signal samples in a first period are obtained. For example, the decoder 260 generates digital signals as elements of the array corr_sig_array, as described with respect to equation (15). Following the generation of the corr_sig_array, the decoder processes samples r[m] of the baseband CPM signal r(t) for a first symbol duration kT<t≤(k+1)T. The samples r[m] are provided to the decoder by the filter 250. In some implementations, the samples are $r_c$[m], which are compensated for frequency offset between the transmitter of the CPM signal and the transceiver 200, as described previously, e.g., by the FO compensation circuit 210.

At 604, the baseband signal samples in the first period are correlated using the correlated signal array values and a branch matrix is populated with the correlated values of the baseband signal samples. For example, for the symbol duration $kT<t\le(k+1)T$, the decoder correlates samples r[m] of the CPM signal with each of the digital signal elements of corr_sig_array to generate the branch matrix bm_acc_array, as described with respect to equation (16).

At 606, the branch matrix values are stored in first and second cost metric arrays and the period is incremented. For example, the decoder 260 creates two cost matrices, new_c_array and old_c_array, and stores the branch matrix values computed above in the two cost matrices, as described with respect to equation (17). The decoder 260 then considers the next symbol duration $(k+1)T<t\le(k+2)T$.

At 608, a determination is made whether the new period is less than or equal to the total number of periods under consideration. For example, the decoder 260 processes the received CPM baseband signal r(t) for the period $kT<t\le(k+n)T$, which includes n symbol durations. Accordingly, at 608, the decoder 260 checks whether the $n^{th}$ symbol duration period is completed, e.g., whether $t=(k+n)T$.

If at 608 it is determined that the new period is less than or equal to the total number of periods under consideration, then at 610 correlated values of signal samples in the new period are computed using the correlated signal array and the branch matrix is populated with the new values. For example, when the new period is $(k+1)T<t\le(k+2)T$, where n>2, then the decoder 260 correlates samples r[m] of the CPM signal with each of the digital signal elements of corr_sig_array to generate new values for the elements of the branch matrix bm_acc_array, as described with respect to equation (16).

At 612, the first cost matrix is regenerated for new period using the new branch matrix values and previously stored values of second cost matrix. For example, at time $t=(k+2)T$, the decoder 260 regenerates the cost matrix new_c_array based on the correlation values of the samples stored in the cost matrix old_c_array during the previous period $kT<t\le(k+1)T$ and using the new branch matrix values generated during the current period $(k+1)T<t\le(k+2)T$, as described with respect to equations (18) and (19).

At 614, the second cost matrix is updated with regenerated first cost matrix values and the period is incremented. For example, following the regeneration of new_c_array during the period $(k+1)T<t\le(k+2)T$, the decoder 260 regenerates the cost matrix old_c_array based on the updated states of new_c_array, as described with respect to equation (20). The decoder 260 then increments the time period and reverts to 608 to determine whether the incremented period is within the total number of periods under consideration. The decoder performs the operations at 610, 612 and 614 iteratively, as described with respect to equation 21, until the end of the $kT<t\le(k+n)T$ is reached.

If at 608 it is determined that the new period exceeds the total number of periods under consideration, then at 616 an element of the first cost matrix that has the maximum magnitude of correlated values is determined. For example, when the end of the period $kT<t\le(k+n)T$ is reached, then at time $t=(k+n)T$, the decoder 260 reads the values of the $2^{n+2}$ states included in new_c_array, and identifies the state for which the magnitude of the state value satisfies is maximum, compared to the values of other states in new_c_array.

At 618, the index for the determined element is converted from decimal value to a binary string. For example, upon identifying the state corresponding to which the magnitude of the state value is maximum in new_c_array, the decoder 260 obtains the state number $st_{max}$, e.g., the index of the row in new_c_array, corresponding to identified state. The decoder converts $st_{max}$ from a decimal value to a binary string.

At 620, information symbols are determined based on the bits of the binary string. For example, upon converting $st_{max}$ from a decimal value to a binary string, the decoder 260 decodes the information symbols of the received CPM baseband signal based on the bits in the binary string. In some implementations, the decoder 260 selects the second to $n^{th}$ bits of the binary string as the (n−1) information symbols $I_{k+1}, I_{k+2}, \ldots, I_{k+n+1}$. However, in some other implementations, a different number of bits of the binary string are decoded as the information symbols, or the bits of the binary string are mapped to different information symbols than the above. In some implementations, the decoder performs further operations on the bits of the binary strings, and derives the information symbols from the results of the operations on the bits.

The disclosed and other examples can be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A device comprising:
    a frequency offset (FO) estimation circuit; and
    a frequency offset (FO) compensation circuit coupled with the frequency offset estimation circuit;
    wherein the frequency offset compensation circuit is configured to (i) receive a continuous phase modulation (CPM) signal, (ii) receive an uncompensated frequency offset for a given sampling window of the CPM signal, (iii) generate a frequency offset compensation value for a next sampling window of the CPM signal based on the uncompensated frequency offset for the given sampling window, wherein the next sampling window immediately follows the given sampling window, (iv) adjust the CPM signal in the next sampling window based on the frequency offset compensation value, and (v) provide the adjusted CPM signal to a filter; and
    wherein the frequency offset estimation circuit is configured to (i) receive first phase values of the adjusted CPM signal, (ii) receive second phase values of a compensating signal, (iii) generate the uncompensated frequency offset for the given sampling window based on the first phase values of the adjusted CPM signal and the second phase values of the compensating signal, and (iv) provide the uncompensated frequency offset for the given sampling window to the frequency offset compensation circuit.

2. The device of claim 1, further comprising a phase differentiator circuit coupled between the frequency offset estimation circuit and the frequency offset compensation circuit, wherein the phase differentiator circuit is configured to:
    receive the adjusted CPM signal from the filter;
    determine the first phase values of the adjusted CPM signal; and
    provide the first phase values of the adjusted CPM signal to the frequency offset estimation circuit.

3. The device of claim 2, wherein the filter is configured to:
    receive the adjusted CPM signal from the FO compensation circuit;
    forward the adjusted CPM signal to the phase differentiator circuit; and
    forward the adjusted CPM signal to a decoder.

4. The device of claim 1, further comprising a compensating signal generator that is configured to:
    receive one or more information symbols at an input of the compensating signal generator, wherein the one or more information symbols are associated with the CPM signal;
    generate the second phase values of the compensating signal based on the one or more information symbols; and
    provide the second phase values of the compensating signal to FO estimation circuit.

5. The device of claim 4, further comprising a decoder that is configured to:
    receive the adjusted CPM signal from the filter;
    decode the adjusted CPM signal to obtain the one or more information symbols associated with the CPM signal; and
    provide the one or more information symbols to the compensating signal generator.

6. The device of claim 1, wherein the FO estimation circuit is further configured to:
    obtain information about a modulation index that is used for transmitting the CPM signal;
    obtain information about the sampling window; and
    generate the uncompensated frequency offset for the given sampling window based on the modulation index and the information about the sampling window.

7. The device of claim 1, wherein the CPM signal includes a Bluetooth signal.

8. The device of claim 1, wherein the CPM signal is based on Gaussian Phase Shift Keying (GPSK) modulation.

9. The device of claim 1, further comprising a modulation index (MI) computation circuit that is configured to:
    receive the first phase values of the adjusted CPM signal at a first input of the MI computation circuit;
    receive the second phase values of the compensating signal at a second input of the MI computation circuit;

compute an estimated value of a modulation index that is used for transmitting the CPM signal based on the first phase values of the adjusted CPM signal and the second phase values of the compensating signal; and provide the estimated value of a modulation index to the FO estimation circuit.

10. The device of claim 9, further comprising a phase differentiator circuit that is configured to:
receive the adjusted CPM signal from the filter;
obtain first phase values of the adjusted CPM signal; and
provide the first phase values of the adjusted CPM signal to one or more of the MI computation circuit or the FO estimation circuit.

11. The device of claim 10, wherein the filter is configured to:
receive the adjusted CPM signal from the FO compensation circuit;
forward the adjusted CPM signal to the phase differentiator circuit; and
forward the adjusted CPM signal to a decoder.

12. The device of claim 9, further comprising a compensating signal generator that is configured to:
receive one or more information symbols at an input of the compensating signal generator, wherein the one or more information symbols are associated with the CPM signal;
generate the second phase values of the compensating signal based on the one or more information symbols; and
provide the second phase values of the compensating signal to one or more of the MI computation circuit or the FO estimation circuit.

13. The device of claim 12, further comprising a decoder that is configured to:
receive the adjusted CPM signal from the filter;
decode the adjusted CPM signal to obtain the one or more information symbols associated with the CPM signal; and
provide the one or more information symbols to the compensating signal generator.

14. The device of claim 9, wherein the FO estimation circuit is further configured to:
obtain the estimated value of the modulation index from the MI computation circuit;
obtain information about the sampling window; and
generate the uncompensated frequency offset for the given sampling window based on the estimated value of the modulation index and the information about the sampling window.

15. The device of claim 9, wherein to compute the estimated value of the modulation index based on the first phase values of the adjusted CPM signal and the second phase values of the compensating signal, the MI computation circuit is configured to:
obtain a product of the first phase values and the second phase values for each sample duration;
add the obtained products corresponding to the sampled durations for a preselected number of durations to obtain a first summation;
obtain quadratic values of the second phase values for each sample duration;
add the quadratic values corresponding to the sampled durations for the preselected number of durations to obtain a second summation; and
divide the first summation by the second summation to obtain the estimated value of the modulation index.

16. The device of claim 15, wherein the preselected number of durations is programmable by a user.

17. The device of claim 9, wherein to compute the estimated value of the modulation index based on the first phase values of the adjusted CPM signal and the second phase values of the compensating signal, the MI computation circuit is configured to:
obtain a first product of the first phase values and the second phase values for each sample duration;
add the first products corresponding to the sampled durations for a preselected number of durations to obtain a first summation;
obtain a second product of the first summation and the preselected number of durations;
obtain a third product of a summation of the first phase values for the preselected number of durations and a summation of the second phase values for the preselected number of durations;
obtain quadratic values of the second phase values for each sample duration;
add the quadratic values corresponding to the sampled durations for the preselected number of durations to obtain a second summation;
obtain a fourth product of the second summation and the preselected number of durations;
obtain quadratic values of the summation of the second phase values for the preselected number of durations; and
divide a difference of the second product and the third product by a difference of the fourth product and the quadratic values of the summation of the second phase values to obtain the estimated value of the modulation index.

18. The device of claim 17, wherein the MI computation circuit is further configured to compute a frequency offset of the received CPM signal based on the first phase values of the adjusted CPM signal and the second phase values of the compensating signal, wherein to compute the frequency offset, MI computation circuit is configured to:
obtain a fifth product of the quadratic values of the summation of the second phase values and the summation of the first phase values for the preselected number of durations;
obtain a sixth product of the first summation and the summation of the second phase values for the preselected number of durations; and
divide a difference of the fifth product and the sixth product by a difference of the fourth product and the quadratic values of the summation of the second phase values to compute the frequency offset.

19. The device of claim 1, further comprising a decoder that is configured to:
receive the adjusted CPM signal from the filter;
obtain first signal samples of the adjusted CPM signal for a first period;
generate a correlated signal array corresponding to consecutive information symbols;
obtain first values by correlating the first signal samples with the correlated signal array;
populate a first cost matrix and a second cost matrix using the first values;
conditioned on determining that the first period is less than a total number of periods under consideration:
obtain second signal samples of the adjusted CPM signal for a second period succeeding the first period;
obtain second values by correlating the second signal samples with the correlated signal array;

regenerate the first cost matrix based on the second values and previously-stored values of the second cost matrix;

regenerate the second cost matrix based on the first cost matrix;

conditioned on determining that the first period is not less than the total number of periods under consideration:

determine an element of the first cost matrix associated with a maximum magnitude of correlated values stored in the first cost matrix;

convert a decimal value of an index of the determined element to a binary string; and obtain information symbols of the adjusted CPM signal from the binary string.

20. The device of claim 19, wherein the first period corresponds to a first symbol duration and the second period corresponds to a second symbol duration, and wherein a number of elements of the correlated signal array is based on a number of signal samples in a symbol duration.

21. The device of claim 19, wherein each index of elements of the first cost matrix and the second cost matrix represent a state of the information symbols of the adjusted CPM signal.

22. The device of claim 19, wherein to obtain the first values, the decoder is configured to populate a branch matrix using the first values, and wherein to populate the first cost matrix and the second cost matrix using the first values, the decoder is configured to populate the first cost matrix and the second cost matrix using the branch matrix values.

23. The device of claim 22, wherein to obtain the second values, the decoder is configured to populate the branch matrix using the second values, and wherein to regenerate the first cost matrix, the decoder is configured to regenerate the first cost matrix based on the second values stored in the branch matrix and the previously-stored values of the second cost matrix.

24. The device of claim 19, wherein to regenerate the first cost matrix, the decoder is configured to:

add new elements to the first cost matrix corresponding to the second period.

25. A method comprising:

receiving a continuous phase modulation (CPM) signal at a first input of a frequency offset (FO) compensation circuit;

receiving an uncompensated frequency offset for a given sampling window of the CPM signal at a second input of the FO compensation circuit;

generating a frequency offset compensation value for a next sampling window of the CPM signal based on the uncompensated frequency offset for the given sampling window, wherein the next sampling window immediately follows the given sampling window;

compensating the CPM signal in the next sampling window using the frequency offset compensation value; and providing the adjusted CPM signal to a filter.

26. The method of claim 25, further comprising:

receiving first phase values of the adjusted CPM signal at a first input of an FO estimation circuit;

receiving second phase values of a compensating signal at a second input of the FO estimation circuit;

generating the uncompensated frequency offset for the given sampling window based on the first phase values of the adjusted CPM signal and the second phase values of the compensating signal; and providing the uncompensated frequency offset for the given sampling window to the FO compensation circuit.

27. The method of claim 26, further comprising:

receiving, at a phase differentiator circuit, the adjusted CPM signal from the filter;

obtaining first phase values of the adjusted CPM signal; and providing the first phase values of the adjusted CPM signal to the FO estimation circuit.

28. The method of claim 26, further comprising:

receiving one or more information symbols at an input of a compensating signal generator, wherein the one or more information symbols are associated with the CPM signal;

generating the second phase values of the compensating signal based on the one or more information symbols; and providing the second phase values of the compensating signal to FO estimation circuit.

29. A method comprising:

receiving a continuous phase modulation (CPM) signal;

obtaining first signal samples of the CPM signal for a first period;

generating a correlated signal array corresponding to consecutive information symbols;

obtaining first values by correlating the first signal samples with the correlated signal array;

populating a first cost matrix and a second cost matrix using the first values;

conditioned on determining that the first period is less than a total number of periods under consideration:

obtaining second signal samples of the CPM signal for a second period succeeding the first period;

obtaining second values by correlating the second signal samples with the correlated signal array;

regenerating the first cost matrix based on the second values and previously-stored values of the second cost matrix;

regenerating the second cost matrix based on the first cost matrix;

conditioned on determining that the first period is not less than the total number of periods under consideration:

determining an element of the first cost matrix associated with a maximum magnitude of correlated values stored in the first cost matrix;

converting a decimal value of an index of the determined element to a binary string; and obtaining information symbols of the CPM signal from the binary string.

* * * * *